United States Patent
Meier et al.

(10) Patent No.: US 6,394,335 B2
(45) Date of Patent: *May 28, 2002

(54) METHOD FOR PRODUCING A MOLDED PART AND A MOLDED PART PRODUCED ACCORDING TO SAID METHOD

(75) Inventors: Markus Meier, Winterthur; Werner Urech, Kaiserstuhl, both of (CH)

(73) Assignee: Elpatronic AG, Bergdietikon (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,219

(22) PCT Filed: Sep. 18, 1997

(86) PCT No.: PCT/CH97/00351

§ 371 (c)(1),
(2), (4) Date: Jun. 1, 1999

(87) PCT Pub. No.: WO98/24569

PCT Pub. Date: Jun. 11, 1998

(30) Foreign Application Priority Data

Dec. 3, 1996 (CH) .............................. 2962/96

(51) Int. Cl.⁷ .................................. B21D 9/00
(52) U.S. Cl. ...................... 228/144; 228/157
(58) Field of Search ............... 228/144, 152, 228/173.1, 173.6, 17.5, 193, 194, 157; 29/897.2, 421.1; 72/367.1, 369, 58

(56) References Cited

U.S. PATENT DOCUMENTS

| 3,729,812 A | * | 5/1973 | Thomas ...................... 29/471.1 |
| 4,133,566 A | * | 1/1979 | Miller ........................ 285/350 |
| 4,301,584 A | * | 11/1981 | Dillner et al. |
| 4,377,942 A | * | 3/1983 | Huydts ........................ 72/389 |
| 4,597,151 A | * | 7/1986 | Zaghi et al. |
| 4,732,819 A | | 3/1988 | Komuro ..................... 428/582 |
| 5,002,219 A | * | 3/1991 | Cadwell |
| 5,070,717 A | | 12/1991 | Boyd et al. ..................... 72/55 |
| 5,118,026 A | * | 6/1992 | Stacher |
| 5,449,109 A | * | 9/1995 | Chuang et al. |
| 5,697,155 A | * | 12/1997 | Bloecker et al. ........... 29/421.1 |
| 5,711,059 A | * | 1/1998 | Schaefer ...................... 29/423 |
| 5,984,163 A | * | 11/1999 | Meier et al. ................ 228/157 |
| 5,987,950 A | * | 11/1999 | Horton .......................... 72/58 |
| 6,055,715 A | * | 5/2000 | Ni et al. |
| 6,070,786 A | * | 6/2000 | Meier et al. |
| 6,087,640 A | * | 7/2000 | Gillespie et al. |

FOREIGN PATENT DOCUMENTS

| DE | 900 085 | 7/1949 |
| DE | 34 18 691 | 2/1986 |
| EP | 0 589 370 | 3/1994 |

* cited by examiner

Primary Examiner—Tom Dunn
Assistant Examiner—Jonathan Johnson
(74) Attorney, Agent, or Firm—McCormick, Paulding & Huber LLP

(57) ABSTRACT

The invention relates to a molded part which is configured by initially forming a tubular body with a welded flange. Subsequently, the body is shaped in a mold placing the body under internal pressure to form a part or preform. Thus, preforms with a welded flange can be obtained and connectedn with other parts.

12 Claims, 2 Drawing Sheets

METHOD FOR PRODUCING A MOLDED PART AND A MOLDED PART PRODUCED ACCORDING TO SAID METHOD

BACKGROUND OF THE INVENTION

The invention relates to a method for the production of a formed sheet-metal component which is formed by internal high-pressure forming. The invention also relates to a formed component produced according to the method.

It is known to shape components by internal high-pressure forming of butt-welded tubular preforms which are cut from corresponding bar stock to the length required. From EP-A-0620056 it is also known to weld together a number of such butt-welded tubular preforms of different diameter and thickness into a single tube which is then formed into a tubular component by internal high-pressure forming.

Extended formed components made from tubular preforms may especially be used as components in motor vehicle construction. Here, these components usually have to be joined to other components, eg. by further welding or by bonding. For certain purposes, it is then necessary for one component to be provided with at least one attachment flange. At least one operation is required to add such a flange to the said components, which is a disadvantage in terms of cost, so that, in this case, several components formed by deep-drawing or pressing are usually welded together in a conventional manner into one formed component.

From EP-A-0589370 it is known to provide two essentially flat metal sheets with a conduit for introducing the fluid for the internal high-pressure forming, and to weld the sheets together at their edges; the result is a formed body with a surrounding flange, which is not desired in edges; the result is a formed body with a surrounding flange, which is not desired in many applications in motor vehicle construction. DE-C-900085 likewise discloses the internal high-pressure forming of two essentially flat metal sheets which have been both welded together and which have a chamber in the middle formed from two domes for the introduction of the pressure fluid. This also produces a formed body with a surrounding flange. Similarly, DE-A 3418691 shows the forming of two or four flat metal sheets which are joined together at their edges. U.S. Pat. No. 5,070,717 shows a flangeless butt-welded tube being formed in such a way that a flange is produced in the forming process. In this way it is possible to produce an extended formed body with a flange on one side only, but additional cutting and welding operations are necessary to obtain a flange form with a straight end face.

SUMMARY OF THE INVENTION

Therefore, the problem which the invention by internal high-pressure forming, provides a component which can easily be produced and be joined to other components, in particular an elongate component with a flange on one side only, or with two flanges on opposite sides of the component.

This object is achieved by forming a body from sheet metal with at least one flange extending outwardly from an edge region of the sheet metal, the flange being welded, and then transforming the body into a preform by means of internal high-pressure forming.

By firstly forming, by rounding, a tubular body with an outwardly directed flange, production is facilitated, since the flange serves as a welding flange which can be welded by conventional low-cost methods at a high rate of production. In the completed formed component, this already existing flange serves as an attachment point for other components, which makes the use of such a formed component advantageous in many applications in comparison with conventional bodies formed by internal high-pressure forming.

In an alternative solution, two half-rounded metal sheets each provided with two projecting flat tongues are first of all joined to form one essentially tubular body with two flanges.

Another object of the invention is to provide a component formed by internal high-pressure forming which can be easily joined to other components. This object is achieved with a formed component made from a sheet metal body provided with an outwardly projecting flange and molded into a shape by the application of internal high-pressure.

BRIEF DESCRIPTION OF THE DRAWINGS

Embodiments of the invention will now be described in detail by way of example, with reference to the drawings, in which.

DESCRIPTION OF THE PREFERRED EMBODIMENT

Figure 1A:
FIGS. 1a–1e show schematically the steps in the production of a formed component produced in accordance with the invention.

FIGS. 1a–1e show schematically a sequence of process steps in the production of a formed component or body according to the invention. In FIG. 1a, 1 denotes a sheet-metal blank from which the body will be formed. This blank 1 may be homogeneous, eg. a wholly steel or aluminium blank consisting of a single piece of the requisite size and with uniform thickness, as illustrated in FIG. 1a. The blank may, however, consist of two or more sheet-metal portions joined together by welding, so that the blank 1 has portions of different thickness and/or with other dissimilarities of material characteristics or properties, which impart to the subsequent formed component local differences in characteristics or properties. Such blanks consisting of portions joined together (so-called tailored blanks) are known, and are used eg. in motor vehicle construction, where they are formed into components in a known manner. The "tailored blank" can be assembled in any desired direction and using any desired welding processes.

Figure 1B:
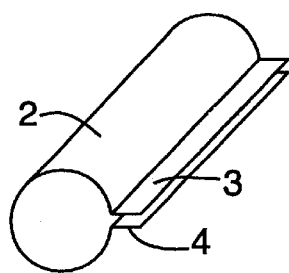
Figure 1D:
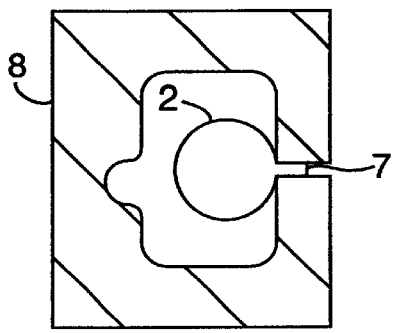

As shown in FIG. 1b the blank is formed into an essentially cylindrical tube 2, two margins 3 and 4 of the blank being formed into tongues projecting from the tubular part 2, these tongues together constituting a flange 7 projecting from the tube. The forming of the blank 1 into the tubular part 2 may be performed on a rounding machine in a conventional manner, with unrounded margins 3,4 forming the tongues.

Figure 1C:
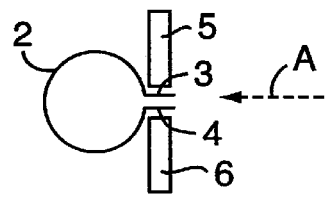

Fabrication of the tubular body 2 continues with the welding together of the tongues 3,4 to constitute the flange 1 (FIG. 1c). This may be performed eg. by lap seam welding with welding rollers 5 and 6, a wire electrode being provided in a known manner at each of the welding rollers 5,6. This has the advantage that coated metal blanks, eg. tinned or galvanized blanks, can be welded without any problem, as the wire electrode is continuously replenished from a spool. Alternatively the flange 7 may be welded eg. by edgewise laser welding, as illustrated in FIG. 1c by the additional arrow A symbolically representing the laser beam impinging on the tongues 3,4. Both roller seam welding and laser beam welding allow lengthy flanges 7 to be continuously welded at a high rate of feed and with high weld quality. It is also possible to employ laser welding in which the flange is through-welded from above or below. Alteratively the margins may be joined together edgewise by other known welding processes such as MIG, MAG, plasma or oxyacetylene welding. Electron-beam welding is also possible. By employing these processes, practically all kinds of sheet metal including, in particular, coated sheet-metal blanks, can be welded with high quality. The welded body 2 has an essentially tubular form with open ends and with a sealingly welded flange 7.

In a next step (FIG. 1d) the body 2 thus formed is placed in a mould 8 for internal high-pressure forming. The inner surface of this mould has a configuration which corresponds to the shape of the formed body to be produced. The mould also has means for closing off the open ends of the tubular body 2 and means for introducing—usually via the end—a fluid at high pressure. The fluid for forming may also be introduced through an orifice or nozzle within the cylindrical portion of the preform. The process of internal high-pressure forming is known in itself and the corresponding devices for carrying out this process are likewise known and available on the marker, and will therefore not be described in further detail here. In the present case, however the mould 8 is configured so that the flange 7 can be clamped in the mould by the mould itself or by additional means, so that the flange 7 is impinged on both faces, over as nearly as possible its entire length, and preferably its full width, during the internal high-pressure forming process, so that the weld seam of the flange is not subjected to opening or pealing forces due to the pressure exerted in the interior of the body 2.

Figure 1E:
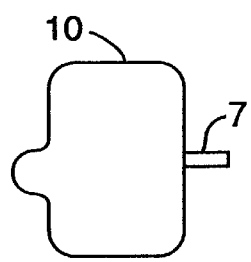

FIG. 1e shows the resulting formed body 10, which has the desired shape imparted by internal high-pressure forming, and is provided with a flange 7 which can be used for attaching be body 10 to another component.

Figure 2:
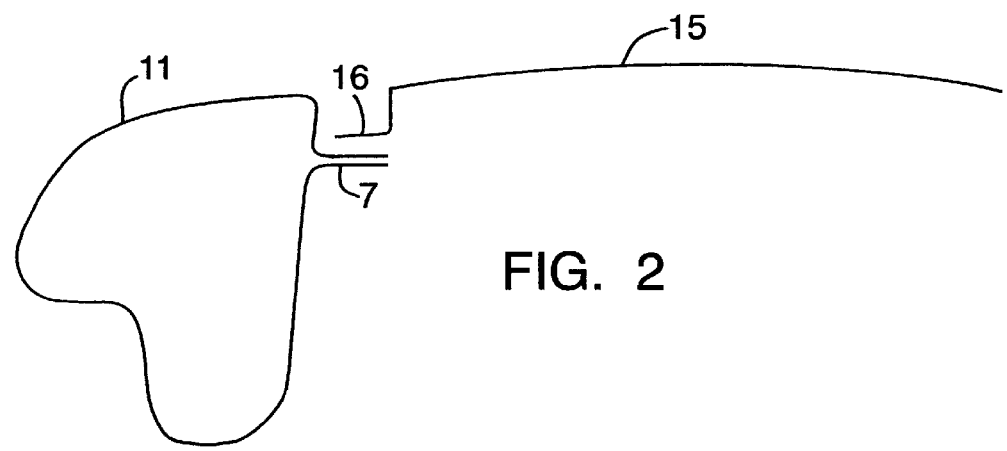
FIG. 2 shows in profile a formed component according to the invention, and its use as a roof edge section for a motor vehicle.

FIG. 2 shows as an example a formed body 11 which has been produced by the steps 1a to 1e described above, used as a roof edge section for a car roof 15. FIG. 2 shows this application in schematic and highly simplified form. It will be seen that the formed body 11 is attached to the roof 15 by its flange 7, eg. by a laser-welded joint (seam 16). Of course, other known attachment techniques (such as spot welding or bonding) might be employed.

Figure 3:
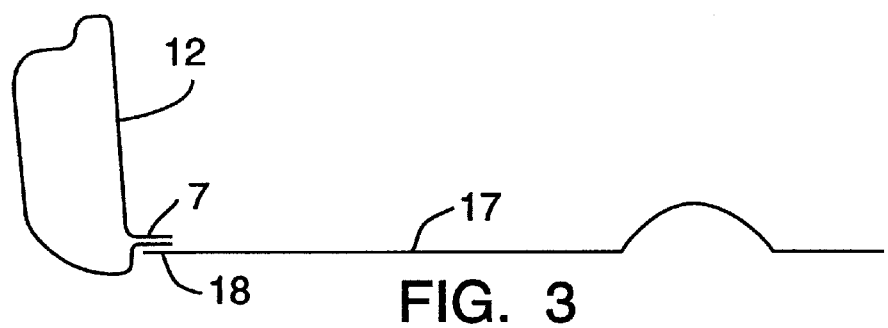
FIG. 3 shows in profile a formed component according to the invention, and its use as a door sill section for a motor vehicle.

FIG. 3 shows a further formed body 12 produced in accordance with the invention. This body—likewise shown only in simplified form—is used as a door sill section for a motor vehicle. 17 denotes a part of the vehicle floor to which the formed body 12 is attached by the flange 7, eg. by spot welding or laser welding.

Figure 4:
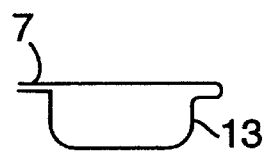
FIG. 4 shows in profile a formed component according to the invention, and its use as a door post for a motor vehicle.

FIG. 4 shows schematically an end view of a formed body 13 according to the invention, which can be used as a door post (B-pillar) of a motor vehicle.

Figure 5:
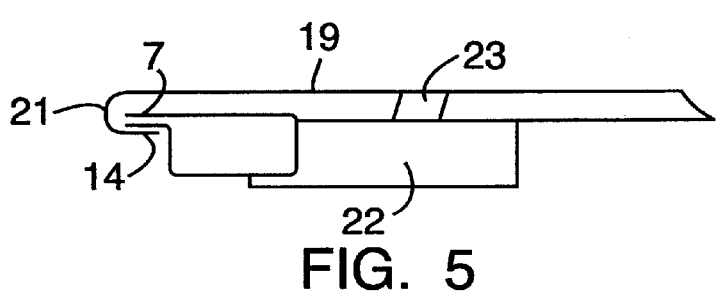
FIG. 5 shows in profile a formed component according to the invention, and its use as a hinge bracket or lock bracket for a motor vehicle.

FIG. 5 shows a further formed body 14 fitted as a formed section in the hinge or lock region of a car engine bonnet or boot lid. The formed body 14 is attached by the flange 7 to the bent-over end 21 of the outer skin 19 of the bonnet or lid. The inner skin is fitted to the outer skin on interposed rubber mountings, and stiffeners 22 are provided.

Figure 6:
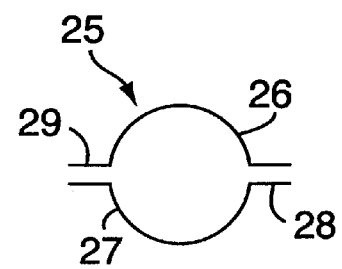
FIG. 6 shows a further embodiment of formed component according to the invention prior to internal high-pressure forming.

FIG. 6 shows a tubular body 25 made up of two half-round formed blanks 26 and 27. Each blank has two projecting margins or tongues which are paired to provide flanges 28 and 29. These are welded as described above with reference to the flange 7 of FIG. 1. The body 25 is also formed by internal high-pressure forming, the two flanges 28 and 29 being gripped over as nearly as possible their entire area. After forming, a formed body 30 with two flanges 28 and 29 results.

Of course, the method according to the invention can be used for producing a large number of formed components for other applications besides motor vehicle construction, such as eg. railcar building or aircraft construction.

What is claimed is:

1. Method for the production of a formed sheet-metal component, comprising the steps of:

rounding at least one sheet-metal blank into an essentially tubular body, wherein the essentially tubular body includes at least one flange formed from unrounded margins of the blank welding the flange subsequent to the rounding of the at least one sheet-metal blank to complete the essentially tubular body; and forming the body into the formed component by internal high-pressure.

2. Method according to claim 1, wherein the flange is welded by roller seam welding with or without wire electrode.

3. Method according to claim 1, wherein the flange is welded by laser welding or electron beam welding.

4. Method according to claim 1, wherein the flange is welded by gas fusion welding or electric arc welding.

5. Method according to claim 1, wherein the flange is clamped during the internal high-pressure forming, in particular by the mould for the internal high-pressure forming.

6. Method according to claim 1, wherein the body is formed from two sheet-metal blanks by providing two flanges.

7. Method according to claim 1, wherein each sheet-metal blank is composed of at least two blanks which are assembled together by welding.

8. Method for the production of a formed sheet-metal component, comprising the steps of:

half-rounding two sheet metal blanks each with flanges on opposite sides formed from unrounded margins of the blanks, wherein said half-rounded sheet metal blanks together form an essentially tubular body;

welding the flanges together subsequent to the rounding of the sheet metal blanks; and forming the essentially body into the formed component by internal high-pressure forming.

9. Method according to claim 8, wherein the flanges are welded by roller seam welding with or without wire electrode.

10. Method according to claim 8, wherein the flanges are welded by laser welding or electron beam welding.

11. Method according to claim 8, wherein the flanges are welded by gas fusion welding or electric arc welding.

12. Method according to claim 8, wherein the two sheet-metal blanks which are assembled together by welding before rounding takes place.

* * * * *

UNITED STATES PATENT AND TRADEMARK OFFICE
CERTIFICATE OF CORRECTION

PATENT NO.   : 6,394,335 B2                                    Page 1 of 1
DATED        : May 28, 2002
INVENTOR(S)  : Markus Meier et al.

It is certified that error appears in the above-identified patent and that said Letters Patent is hereby corrected as shown below:

Title page,
Item [57], ABSTRACT,
Please insert the following: -- The invention relates to a molded part which is configured by initially forming a tubular body with a welded flange. Subsequently, the body is shaped in a mold by placing the body under high internal pressure to form a part or preform. Thus, preforms with a welded flange can be obtained and connected with other parts. --

Signed and Sealed this

Third Day of December, 2002

JAMES E. ROGAN
*Director of the United States Patent and Trademark Office*